(12) United States Patent
Reimnitz et al.

(10) Patent No.: US 12,738,824 B2
(45) Date of Patent: Sep. 15, 2026

(54) ELECTRIC AXIAL FLUX MACHINE WITH PRETENSIONED STATOR COMPONENTS, AND ELECTRIC MACHINE ASSEMBLY COMPRISING SUCH AN ELECTRIC AXIAL FLUX MACHINE

(71) Applicant: Schaeffler Technologies AG & Co. KG, Herzogenaurach (DE)

(72) Inventors: Dirk Reimnitz, Buhl (DE); Ivo Agner, Buhl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 211 days.

(21) Appl. No.: 18/704,541

(22) PCT Filed: Oct. 24, 2022

(86) PCT No.: PCT/DE2022/100779
§ 371 (c)(1),
(2) Date: Apr. 25, 2024

(87) PCT Pub. No.: WO2023/072335
PCT Pub. Date: May 4, 2023

(65) Prior Publication Data

US 2025/0233495 A1 Jul. 17, 2025

(30) Foreign Application Priority Data

Oct. 26, 2021 (DE) ........................ 102021127751.5

(51) Int. Cl.
*H02K 21/02* (2006.01)

(52) U.S. Cl.
CPC ................................ *H02K 21/026* (2013.01)

(58) Field of Classification Search
CPC .......... H02K 1/32; H02K 21/24; H02K 1/182; H02K 1/20; H02K 3/24; H02K 5/20
See application file for complete search history.

(56) References Cited

U.S. PATENT DOCUMENTS

| | | | | |
|---|---|---|---|---|
| 9,496,776 | B2 * | 11/2016 | Woolmer | H02K 5/203 |
| 2009/0134723 | A1 * | 5/2009 | Takeuchi | H02K 21/026 310/48 |
| 2013/0270834 | A1 * | 10/2013 | Staghoj | F03D 13/20 310/90 |

FOREIGN PATENT DOCUMENTS

| | | | |
|---|---|---|---|
| CN | 102136771 | A | 7/2011 |
| DE | 102012013199 | A1 | 4/2013 |

* cited by examiner

*Primary Examiner* — Leda T Pham
(74) *Attorney, Agent, or Firm* — Volpe Koenig

(57) ABSTRACT

An electric axial flux machine including a stator which has at least one stator half, a rotor which is arranged axially to the stator and which is rotatably mounted relative to the stator, and a rotor shaft which contacts the rotor in a rotationally fixed manner. A magnetic force acts between the rotor and the stator in the axial direction. Structural measures are taken in order to generate a pretension which pushes the at least one stator half away from the rotor in order to counteract the magnetic force.

9 Claims, 3 Drawing Sheets

ELECTRIC AXIAL FLUX MACHINE WITH PRETENSIONED STATOR COMPONENTS, AND ELECTRIC MACHINE ASSEMBLY COMPRISING SUCH AN ELECTRIC AXIAL FLUX MACHINE

CROSS-REFERENCE TO RELATED APPLICATIONS

This application is the U.S. National Phase of PCT Appln. No. PCT/DE2022/100779, filed Oct. 24, 2022, which claims the benefit of German Patent Appln. No. 102021127751.5, filed Oct. 26, 2021, the entire disclosures of which are incorporated by reference herein.

TECHNICAL FIELD

The present disclosure relates to an electric axial flux machine having a stator which has a first and a second stator half, the radially outer end faces of which are connected to one another via a radially outer connection, having a rotor which is arranged between the stator halves and which is rotatably mounted relative to the stator, and having a rotor shaft which contacts the rotor in a non-rotatable manner. The rotor shaft supports the respective first and second stator halves via a bearing arrangement, wherein a magnetic force acts between the rotor and the stator in the axial direction. Furthermore, the present disclosure relates to an electric machine arrangement having such an electric axial flux machine.

BACKGROUND

In electric motors or electric machines, a (strong) magnetic field is generated between the stator and rotor so that a (strong) magnetic force acts between these components. This magnetic force must be supported and borne by the structure of the electric motor, in particular in its entirety. In electric motors, an exact, rigid mechanical motor structure is important, in particular for the components through which a magnetic field generated in the electric motor flows, as even small positional deviations between the components (such as changed air gaps between the rotor and stator, in particular in axial flux machines) can have a significant influence on the magnetic flux. It is therefore important to be able to ensure a very precise mechanical structure of the electric motor in order to ensure the necessary exact alignment of the electric and/or magnetic components. Dimensional deviations, i.e., deviations with respect to shapes or positions, in the electric motor due to the magnetic force (for example due to elastic deformations of components that occur due to the magnetic force) impair its efficiency, service life and/or performance.

The force support for axial flux machines as a special embodiment of electric motors poses a particular challenge. In axial flux machines, the stator and rotor are arranged axially (in relation to an output shaft or rotation axis of the electric motor) next to one another and the magnetic forces between the stator and rotor act in the axial direction. Axial flux machines usually have relatively flat, disc-shaped rotors and stators, for which it is difficult to support the magnetic forces acting on them, in particular in the case of changing loads (such as changing magnetic forces, intermittent inertial forces due to vehicle acceleration or centrifugal force changes at different speeds). With axial flux machines in particular, even small axial displacements of the stator structure have a major influence on the width of the air gaps between the rotor and stator. A slight change (widening or narrowing) in the width of these air gaps can already significantly change the properties of the axial flux machine.

For this reason, an electric axial flux machine in an I arrangement has already been developed in the prior art, i.e., an electric axial flux machine in which a rotor is arranged axially between two stator halves, each of which is connected to one another at its radially outer end face (relative to an output shaft of the axial flux machine) via a radially outer connection. In addition, the two stator halves are connected at their radially inner end face (relative to an output shaft of the axial flux machine) by a bearing arrangement, in particular by one bearing in each case, to a rotor shaft coupled in a non-rotatable manner to the rotor.

The magnetic force acting in the axial direction can be supported in such an electric axial flux machine both via the bearing arrangement and via the radially outer connection, hereinafter referred to as the "yoke". The magnetic force acting on the two stator halves therefore does not have to be transmitted from one stator half to the other via the yoke alone. If the magnetic force were to be only absorbed/transmitted by the yoke, this would require a particularly robust, heavy and large support structure (for example a thick-walled stator housing) in order to prevent the inner edge of each of the stator halves, which are subjected to an alternating magnetic force, from being deflected unacceptably far in the axial direction. However, the bearing arrangement and the yoke interact in such a way that the stator structure is insensitive to deformations due to the magnetic forces acting on it, which has a very positive effect on the electric motor, in particular on its efficiency, service life and performance.

In an electric axial flux machine of this type, the bearing arrangement absorbs about half (slightly less than 50%) of the magnetic forces acting on it. This places a heavy load on the bearing arrangement.

Such high loads on the bearing arrangement or bearings can significantly shorten their service life. If the bearing arrangement is overloaded due to the high load, it may no longer be able to support the stator halves as intended and the air gap between the rotor and stator may change as a result (in particular, it may become smaller). This would result in a significant and detrimental change in the motor characteristics. In order to prevent an unwanted change in the air gap and premature bearing damage, correspondingly large, heavy-duty bearings would have to be used for such high bearing loads. However, the larger and more highly loaded the bearings have to be, the more expensive and bulky the bearings become and the greater the bearing losses (such as rolling friction losses and drag torques).

SUMMARY

The present disclosure is therefore based on the object of minimizing or eliminating the disadvantages of the prior art. In particular, it is the object of the disclosure to provide an electric axial flux machine which, on the one hand, itself has a high degree of efficiency, a long service life and excellent performance and the bearings of which are at the same time smaller and less expensive and have an extended service life compared to conventional bearings. Yet, the basic dimensions of the components of the electric axial flux machine through which the magnetic field flows should not be changed from the prior art. It is particularly desirable to transmit a larger proportion (by percentage) of the magnetic force via the radially outer connection (the yoke) between the stator halves.

This object is achieved by an electric axial flux machine having the features of claim 1.

An electric axial flux machine, preferably for driving an electrically drivable motor vehicle, is preferably designed with a stator which has a first and a second stator half, the radially outer end faces of which (in relation to an output shaft or rotation axis of the axial flux machine) are connected to one another via a radially outer connection, with a rotor which is arranged between the stator halves and is rotatably mounted relative to the stator, and with a rotor shaft which contacts the rotor in a non-rotatable manner. The rotor shaft supports the respective first and second stator halves (in particular their radially inner end faces) via a bearing arrangement (radially inner connection). A magnetic force or magnetic field acts between the rotor and stator in the axial direction (in relation to an output shaft or rotation axis of the axial flux machine). In at least one of the two stator halves, structural measures are taken in order to generate a preload which pushes at least one of the two stator halves away from the rotor in order to counteract the magnetic force.

In other words, the at least one stator half achieves a spring effect directly (via its material properties) or indirectly (via an external preloading element), which counteracts the magnetic forces and thus also, for example, an elastic deformation of the stator structure. The preload thus counteracts the magnetic force and thus any potential elastic deformation of the stator components/stator structure.

In this context, the magnetic force flows axially, on the one hand, from one stator half via the bearing arrangement to the rotor shaft and from this to the other stator half via the bearing arrangement and, on the other hand, to the other stator half via the radially outer connection. The magnetic force usually acts on the stator halves in such a way that it attracts the stator halves in an axial direction towards the rotor. The preload/preload force of at least one stator half counteracts this magnetic force, i.e., the preload acts in the axial direction away from the rotor. This results in a total axial force: if the total preload force is greater than the maximum magnetic force, the total axial force acts outwards from the stator halves away from the rotor. If the magnetic force is greater than the total preload force, the total axial force acts inwards from the stator halves towards the rotor. Due to the preload, the stator structure has a tendency for the two stator halves to move away from one another, i.e., also away from the rotor. This advantageously reduces the magnetic force acting on the bearing arrangement. This can advantageously increase the service life of the bearing arrangement, which in turn ensures high efficiency, performance and service life of the electric axial flux machine.

In other words, the present disclosure relates to an electric machine arrangement having an axial flux electric machine, preferably for driving an electrically drivable motor vehicle, having a stator and a rotor. A rotor shaft is in rotating contact with the rotor. The rotor is rotatably mounted via at least one bearing point/bearing arrangement within the electric machine arrangement. Preferably, the stator has at least a first and a second stator half, which are axially spaced apart from the rotor on respectively different axial sides by an air gap.

In order to reduce a high load on the bearing point/bearing arrangement, a larger proportion of an axial force is transmitted via an axially outer connection point (a radially outer connection) between at least one of the stator halves through a stator support structure. A bearing arrangement (radially inner connection) of the at least one stator half via a bearing and the rotor is relieved by a preload of the stator support structure. The inherent rigidity of the stator support structure tends to move an inner part of the at least one stator half axially against magnetic forces. In addition, the preload of the stator support structure can counteract a deformation or slippage of the stator due to the forces acting on the stator.

Further advantageous embodiments of the disclosure are specified in the dependent claims.

In an advantageous embodiment of the disclosure, the at least one stator half itself has the preload (integral) and/or the preload is achieved by an external preloading element which is formed separately from the stator and is connected to the at least one stator half.

There are therefore two different ways of preloading the at least one stator half, which can also be combined with one another. The first way is based on the preload being an intrinsic (material) property of the at least one stator half, while the second is based on the preload being achieved by an external preloading element formed separately from the stator half, which is coupled to the at least one stator half.

It is conceivable in this regard that the stator has a stator housing which has a first half shell, which defines an outer edge or outer side of the first stator half, and a second half shell, which defines an outer edge or outer side of the second stator half, and the first half shell and/or the second half shell have such an inherent rigidity that the half shell(s) itself/themselves has/have or provide(s) the preload/preload force which counteracts the magnetic force.

The circumstance that the stator structure wants to return from the installed state to the free state due to the preload creates a spring effect, in particular an elastic spring effect. This spring effect counteracts the magnetic force and/or the resulting (elastic) deformations of the stator structure. Providing the half shell(s), which is/are itself/themselves a component/components of the axial flux machine, with the preload therefore has the advantage that deformations in the structure of the axial flux machine can at least partially be compensated for, which would otherwise occur in the components of the axial flux machine due to the magnetic force. Instead of constructing the stator structure in such a way that it already assumes the ideal geometric shape before the magnetic forces act on it, the stator structure or parts of the stator structure are formed in such a way that they deviate from the desired shape for the operation of the motor in the force-free state and are brought into the ideal shape or into a shape that almost corresponds to the ideal shape by the forces then acting on them during operation of the motor.

The preload force of the half shells can be used to influence how large the proportion of the magnetic force is that is transmitted radially on the outside via the yoke and how large the proportion of the magnetic force is that is transmitted radially on the inside via the bearing arrangement. In this regard, it is expedient to select/adjust the preload force of the half shells in such a way that the largest possible proportion of magnetic force is transmitted via the yoke. However, it should also be guaranteed that a minimum proportion of the magnetic force is transmitted radially on the inside via the bearing arrangement so that a sufficient minimum load on the bearing is ensured. In this context, the magnetic force also acts when the electric axial flux machine is not energized, so that a certain minimum magnetic force is always present. Ideally, the inherent rigidity of the half shell(s) or its/their preload force should be selected in such a way that even with a minimum magnetic force, a sufficient minimum axial load on the bearing arrangement is still guaranteed and as much force as possible is transmitted via the yoke. If the axial flux machine is energized, the magnetic force is usually greater than the minimum magnetic force and this force difference is then divided into an additional axial force acting on the bearing arrangement and an additional axial force acting on the yoke within the context of the geometric conditions.

Preferably, the preload of the half shell(s) is implemented in such a way that the first and/or the second half shell is/are manufactured with such an inherent rigidity that, in a free state, before the stator halves are connected to the rotor shaft via the bearing arrangement, the half shells extend continuously and increasingly away from the rotor, starting from their radially outer end face/from their radially outer end towards their radially inner end face/their radially inner end. Thus, in their free state, the half shell(s) extend(s) at an angle to the radial direction of the axial flux machine. If the half shell(s) is/are in the installed state (this is the case when the stator halves or their half shells are connected to the rotor shaft via the bearing arrangement), the half shell(s) extend/s along (in) the radial direction.

In this way, it is particularly easy to apply a preload or preload force to the half shell(s).

In particular, it is conceivable that the inherent rigidity of the half shell(s) is set depending on the rigidity or thickness of the half shell(s).

This has the advantage that the preload can be individually adjusted for the respectively used axial flux machine. This means that a wide variety of axial flux machines can be optimally protected against structural deformation in a simple way.

Preferably, it is provided that if the first and second half shells are equally rigid, in particular thick, the preload, i.e., the preload path and/or preload force, of the first and second half shell is identical, and if one of the two half shells is more rigid, in particular thicker, than the other half shell, the more rigid half shell is provided without preload or with a smaller preload path than the less rigid half shell.

The thicker a half shell is, the less elastic and the more stable it is. Accordingly, as the thickness of a half shell increases, less of a preload path is required for the half shell, as thicker half shells are better able to counteract the magnetic force acting on them due to their material rigidity. In addition, with more rigid/thicker half shells, the required preload force is already generated with a smaller preload path, since preload force=rigidity*preload path.

In the case of two half shells of different rigidities or thicknesses, it is possible in this regard to apply a preload force only to the less rigid or less thick half shell and not to the other. Alternatively, it is possible to preload both half shells in the case of two half shells of different rigidities or thicknesses. In this case, it would make sense to provide the more rigid/thicker half shell with a smaller preload path than the less rigid/thick half shell. This allows the preload forces of the two half shells of different rigidities to be adjusted so that they act in opposition to the magnetic force and are of equal magnitude.

Preferably, as an alternative or in addition to the embodiment of providing the stator half or halves itself/themselves with the preload, a further embodiment is provided in which the at least one stator half is provided with the preload by an external preloading element, in particular a spring, which is formed separately from the stator half, wherein a first end of the external preloading element is supported on/attached to the radially outer end face/the radially outer end of the at least one stator half and a second end of the external preloading element is supported on/attached to a radially more inwardly located region of the at least one stator half, so that the external preloading element exerts a tensile force on the at least one stator half that counteracts the magnetic force.

Preferably, as an alternative or in addition to the embodiment of providing the stator half or halves itself/themselves with the preload, a further embodiment is provided in which the at least one stator half is provided with the preload by an external preloading element, in particular a disc spring, which is formed separately from the stator half, wherein the outer diameter of the external preloading element is supported on/attached to the radially outer end face/the radially outer end of the at least one stator half and the inner diameter of the external preloading element is supported on/attached to a radially more inwardly located region of the at least one stator half, so that the external preloading element exerts a tensile force on the at least one stator half that counteracts the magnetic force.

In contrast to the embodiment in which the stator half or halves itself/themselves are provided with the preload, in the embodiment in which an external preloading element provides the preload, a significantly stronger spring effect or preload force can be achieved, which counteracts the magnetic force in the axial flux machine. If the external preloading element is used as a separately formed component, it can be more easily optimized for larger spring forces than if the preload is integrated into the stator structure, which primarily has functions other than preloading. This means that the shape, material and manufacturing process of the external preloading element can be optimized for high force absorption/transmission. If both the at least one stator half itself, or its half shell, is provided with the preload and an additional preload is set via an external preloading element, a very strong spring effect can be achieved by this combined preload, which optimally counteracts the magnetic force in the axial flux machine.

In a preferred embodiment, the stator has a stator housing or other elastically deformable component which extends from a radially outer region of the stator to a radially inner region of the stator and which is subjected to an elastic deformation starting from its free state not mounted with the other stator components to its state mounted in or on the stator and loaded with the forces caused by the magnetic field of the motor. This elastic deformation causes the radially central part of the stator housing or the other elastically deformable stator component to displace axially relative to its radially outer region and its radially inner region from its free state not mounted with the other stator components to its state mounted in or on the stator and loaded with the forces caused by the magnetic field of the motor in the direction of the rotor. This elastic displacement of the radially central part in the direction of the rotor causes a force effect that the radially central part can exert on the surrounding components of the elastically deformed component, which is oriented away from the rotor. The force effect of the radially central part is therefore directed against the force of the magnetic field and thus makes it easier for the neighboring components of the component, which is elastically deformed in a targeted manner during assembly, to withstand and dissipate the forces caused by the magnetic field. This preload of individual components caused by the shaping and elastic deformation during assembly, which can withstand this mechanical load particularly well, can relieve the load on other components in the stator. This makes it possible, for example, to optimize some stator components for supporting the mechanical loads caused by the magnetic forces (for example by means of appropriate material selection and shaping) and to operate other components, which are relieved by the preload of the neighboring components and therefore no longer have to provide a significant contribution to supporting the forces caused by the magnetic field, in a form that does not deviate from their free form before assembly in the operational motor and then to be able to optimize these components for other requirements, such as electrical conductivity or good electrical insulation.

In a preferred embodiment, the stator has a stator housing or other elastically deformable component which extends from a radially outer region of the stator to a radially inner region of the stator and which is subjected to an elastic deformation starting from its free state not mounted with the other stator components to its state mounted in or on the stator and loaded with the forces caused by the magnetic field of the motor.

The elastic deformation of the component extending in or on the stator from a radially outer region of the stator to a radially inner region of the stator can be achieved by a curvature in which the radially central part is turned further towards or further away from the rotor relative to the radially outer region and radially inner region. In this regard, different variants are possible. Before assembly with the remaining stator parts, the elastically deformable component can have a central part that is curved further away from the rotor than in the mounted state of the stator. Before assembly with the remaining stator parts, the elastically deformable component can have a central part that is curved away from the rotor and is straight in the mounted state of the stator. Before assembly with the remaining stator parts, the elastically deformable component can have a central part that is curved away from the rotor and is curved towards the rotor in the mounted state of the stator. Before assembly with the remaining stator parts, the elastically deformable component can be straight and have a central part that is curved towards the rotor in the mounted state of the stator. Before assembly with the remaining stator parts, the elastically deformable component can have a central part that is curved towards the rotor and is curved even further towards the rotor in the mounted state of the stator.

In a preferred embodiment, the stator has a stator housing which has a first half shell, which defines an outer edge or outer side of the first stator half, and a second half shell, which defines an outer edge or outer side of the second stator half, and wherein at least one longitudinal side or end face of the first half shell and/or the second half shell in a state without the action of the magnetic force has or have an outer curvature expanding away from the rotor in the axial direction and, in particular, is or are flat in a state under the action of a minimum magnetic force.

This means that at least the longitudinal side of at least one of the half shells, in particular both half shells, has an outer curvature that is only visible or measurable when the axial flux machine is not in operation (not under load). Under load in the axial flux machine, the magnetic force acting towards the rotor exerts such a force on the half shell(s) that its/their shape is flat.

The outer curvature of the half shell(s) can advantageously ensure the most uniform possible width of an air gap provided between the rotor and stator under load. The outer curvature of the half shell(s) also prevents the half shell(s) from bending axially inwards towards the rotor or bending too far due to the magnetic force acting on them.

Preferably, the bearing arrangement has two bearings, each of which connects one stator half or its half shell to the rotor shaft, in an X arrangement in relation to one another if the total preload force (sum of all preload forces) in the axial flux machine is set to be less than (or equal to) the magnetic force, and the bearing arrangement has two bearings, each of which connects one stator half to the rotor shaft, in an O arrangement in relation to one another if the total preload force in the axial flux machine is set to be greater than a maximum occurring magnetic force.

Preferably, the bearing arrangement has two bearings, each of which connects one stator half or its half shell to the rotor shaft in such a way that the half shell can exert an axial force on the rotor shaft in the direction of the other stator half (an axial compressive force is generated in the shaft between the two bearings) if the total preload force, i.e., the sum of all preload forces, in the axial flux machine is set to be less than (or equal to) the magnetic force. The two bearings are expediently designed and arranged in such a way that they have an X arrangement in relation to one another with respect to their force transmission direction.

If the total preload force in the axial flux machine is set to be greater than a maximum occurring magnetic force, the bearing preferably has two bearings, each of which connects one stator half or its half shell to the rotor shaft in such a way that the half shell exerts an axial force on the rotor shaft that is directed away from the other stator half (an axial tensile force is generated in the shaft between the two bearings). The two bearings are expediently designed and arranged in such a way that they have an O arrangement in relation to one another with respect to their force transmission direction.

The total preload force in the axial flux machine is greater than the maximum occurring magnetic force in particular if the preload is set at least by an external preloading element.

If the bearings are arranged in an X arrangement in relation to one another, the centers of pressure of the two bearings are located between the bearings in each case. The bearings in an X arrangement are particularly good at counteracting the total axial force directed inwards (towards the rotor), which occurs when the magnetic force is greater than the total preload force. If the bearings are aligned in an O arrangement in relation to one another, the centers of pressure of the two bearings are located outside of the bearings in each case. The bearings in an O arrangement are therefore particularly good at counteracting the total axial force directed outwards, which occurs when the total preload force is greater than the maximum occurring magnetic force.

Since the arrangement of the bearings in relation to one another depends on the direction of action of the total axial force and thus on the magnitude of the (total) preload force, the rotor shaft can be supported on the two stator halves in a tilt-stable manner in any case. This means that the structure of the axial flux machine is stable in any case.

Furthermore, the disclosure relates to an electric machine arrangement having the previously described electric axial flux machine. The electric machine arrangement has all the advantages of the electric axial flux machine according to the disclosure.

A drive train having such an electric machine arrangement and a motor vehicle having such a drive train are further proposed.

BRIEF DESCRIPTION OF THE DRAWINGS

The disclosure will now be explained in more detail with reference to figures, in which context various embodiments are also described.

In the figures.

The figures are merely schematic in nature and serve solely for understanding the disclosure. In particular, it should be noted that the figures and in particular the size relationships shown are only schematic in nature. Identical elements are provided with the same reference symbols. Furthermore, the different features of the various embodiments can be freely combined with one another.

DETAILED DESCRIPTION

In FIGS. 1 to 5 described below, an output shaft AW of an electric axial flux machine 1 defines the axial direction (see arrow AR) and the radial direction (see arrow RR). The output shaft AW defines the rotation axis R of the axial flux machine 1 with its longitudinal axis, which runs in the axial direction.

Figure 1:
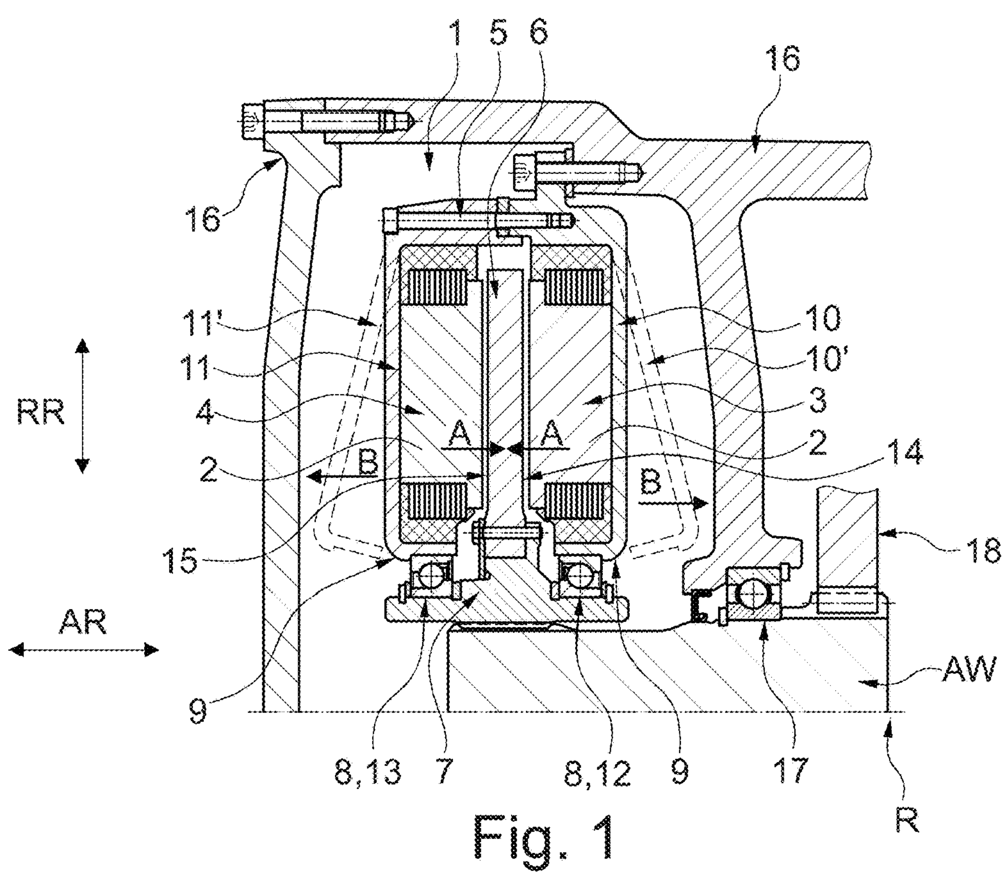
FIG. 1 shows a schematic representation of an electric axial flux machine in an I arrangement in an axial section, in which both stator halves are themselves provided with a preload.

FIG. 1 shows an electric axial flux machine 1, which can also be referred to as an axial flux motor, in an I arrangement for driving an electrically drivable motor vehicle. The electric axial flux machine 1 has a stator 2, which has a first and a second stator half 3, 4. The end faces of the first and second stator halves 3, 4, which are located radially on the outside with respect to an output shaft AW of the axial flux machine 1, are connected to one another via a radially outer connection 5 (hereinafter also referred to as a "yoke"). In this regard, the radially outer connection 5 is designed with a fastening means, in particular a bolt or screw, which engages in holes provided for this purpose in the respective stator half 3, 4.

Furthermore, the electric axial flux machine 1 has a rotor 6, which is rotatably mounted relative to the stator 2, and a rotor shaft 7 which contacts the rotor 6 in a non-rotatable manner. The rotor 6 is surrounded on one axial side by the first stator half 3 and on its other axial side by the second stator half 4. The rotor shaft 7 is connected to an external toothing of the output shaft AW via an internal toothing. The rotor shaft 7 is connected in each case to the radially inner end face of the first and second stator half 3, 4 in relation to the output shaft AW via a bearing arrangement 8.

The rotor 6 has at least one rotor magnet (such as permanent magnets) and the two stator halves 3, 4 each have at least one stator magnet (such as electromagnets). A magnetic field is generated between the stator magnets and the rotor magnet when the axial flux machine 1 is energized. This magnetic field causes the rotor 6 to rotate relative to the stator 2. The rotor shaft 7 then rotates with the rotor 6 and the toothing of the rotor shaft 7 rotates the output shaft AW, which rotates about its longitudinal axis. A magnetic force acts in the axial direction between the rotor magnet of the rotor 6 and the stator magnets of the stator 2 due to the magnetic field. The magnetic force in each case acts from the stator magnets inwards towards the rotor magnet (see arrows A).

In the present case, both stator halves 3, 4 are provided with a preload or preload force that counteracts the magnetic force. The preload force inherent in the stator halves 3, 4 (see arrows B) is directed in the axial direction away from the rotor and thus in the opposite direction to the direction of action of the magnetic force (see arrows A).

The preload force acts in the radially central region and in the radially inner region in the axial direction away from the rotor. For this purpose, the elastically deformed components that cause the preload force are supported on the radially outer connection 5 between the two stator halves. In this connection region, the elastically deformed components, which cause the preload force, cause a force effect in the opposite direction to the force effect in the radially outer and central regions. In the radially outer connection 5, the elastically deformed components that cause the preload force cause an axial compressive load.

The stator has a stator housing 9, which in turn has two half shells, a first half shell 10 and a second half shell 11. The first half shell 10 surrounds or encloses the first stator half 3 on the sides of the first stator half 3 that do not face the rotor 6, and thus defines the outer edge or outer side of the first stator half 3. The second half shell 11 surrounds or encloses the second stator half 4 on the sides of the second stator half 4 that do not face the rotor 6, and thus defines the outer edge or outer side of the second stator half 4. The first and second half shells 10, 11 are each shown twice in FIG. 1: once in the installed state as a solid line (10, 11) and once in the free state as a dashed line (10', 11').

In the present case, the first and second half shells 10', 11' are provided/manufactured with such an inherent rigidity that the half shells 10', 11' in the free state (before fastening to the rotor shaft 7 via the bearing arrangement 8) extend continuously and increasingly axially outwards, i.e., away from the rotor, starting from their radially outer end face towards their radially inner end face. Thus, in a state before they are connected to the rotor shaft 7, the half shells 10', 11' extend in an inclined/angled manner with respect to the radial direction. In the state in which the half shells 10, 11 are connected to the rotor shaft 7 via the bearing arrangement 8, the half shells 10, 11 are in the installed state and extend along (in) the radial direction.

The bearing arrangement 8 is designed here in the form of two bearings, a first bearing 12 and a second bearing 13, each of which is designed in particular as a single-row angular contact ball bearing. The bearings 12, 13 support the rotor 6 both axially and radially via the rotor shaft 7 on the two stator halves 3 and 4. The first bearing 12 thus connects the first stator half 3 to the rotor shaft 7 and the second bearing 13 connects the second stator half 4 to the rotor shaft 7. More precisely, the first bearing 12 connects the first half shell 10 to the rotor shaft 7 and the second bearing 13 connects the second half shell 11 to the rotor shaft 7.

The bearings 12, 13 are provided in FIG. 1 in an X arrangement in relation to one another. An X arrangement of two bearings in relation to one another means that the center of pressure of the respective bearings lies between the bearings. Generally speaking, it is considered expedient to use the X arrangement if the bearings each transmit an axial force in the direction of the other bearing, as is the case here.

This is because the magnetic force in the present embodiment of FIG. 1 is greater than the (total) preload force of the half shells 10, 11, so that a resulting total axial force acts inwards towards the rotor.

The first and second bearing 12, 13 thus, on the one hand, fulfill the task of holding the rotor 6 and the rotor shaft 7 in position by connecting them to the stator halves 3, 4, and, on the other hand, the two stator halves 3, 4 can transmit the magnetic force acting on them to the respective other stator half 3, 4 via the respective bearings 12, 13 assigned to them. In the process, a part of the magnetic force is transmitted, for example, from the first stator half 3 via the first bearing 12 to the rotor shaft 7, from this to the second bearing 13 and from the second bearing 13 to the second stator half 4 and vice versa. The other part of the magnetic force is transmitted between the two stator halves 3, 4 via the yoke 5. Overall, the stator housing 9 thus absorbs a large part of the magnetic force. This prevents a first air gap 14, which is provided between the rotor 6 and the first stator half 3 and extends in the radial direction, and a second air gap 15, which is provided between the rotor 6 and the second stator half 4 and extends in the radial direction, from changing to an impermissible degree (such as by becoming too small) due to the magnetic force. The constant width of these air gaps 14, 15 is necessary in order to maintain the efficiency of the electric axial flux machine 1 and is required for its proper functioning.

The magnetic force acts most strongly on the central region of the stator halves 3, 4 as viewed in the radial direction. The magnetic force introduced mainly in the central region of the stator halves 3, 4 is then transmitted partly via the yoke 5 and partly via the bearings 12, 13 and the rotor shaft 7 to the respective other stator half 3, 4. As the magnetic force starting from the rotor pulls both stator halves 3, 4 towards the rotor, the force flow is closed via the connections 5, 8 (yoke and bearing) between the stator halves 3, 4.

The preload force of the half shells 10, 11 can be used to influence how large the proportion of the magnetic force is that is transmitted radially on the outside via the yoke 5 and how large the proportion of the magnetic force is that is transmitted radially on the inside via the bearings 12, 13 and the rotor shaft 7. Here, the preload force of the half shells 10, 11 is selected/adjusted in such a way that the largest possible proportion of the magnetic force is permanently transmitted via the yoke 5 and at the same time a minimum proportion of the magnetic force is transmitted radially on the inside via the bearings 12, 13 so that a sufficient bearing load is ensured. The half shells 10, 11 therefore have a tendency to move away from the bearings 12, 13 due to their preload force on their radially inner end face. The preload force of the half shells 10, 11 thus acts in the axial direction away from the rotor 6 and thus counteracts the magnetic force, which pulls the stator halves 3, 4 and thus also the half shells 10, 11 towards the rotor 6.

Furthermore, the electric axial flux machine 1 has an axial flux machine housing 16, to which the stator 2 is connected via a fastening means, in particular a bolt or screw. In addition, the axial flux machine housing 16 supports the output shaft AW via a bearing 17 (single-row ball bearing). Furthermore, the output shaft AW meshes with a gear wheel of a gear stage 18 outside of the axial flux machine housing 16 via a further external toothing.

Figure 2:
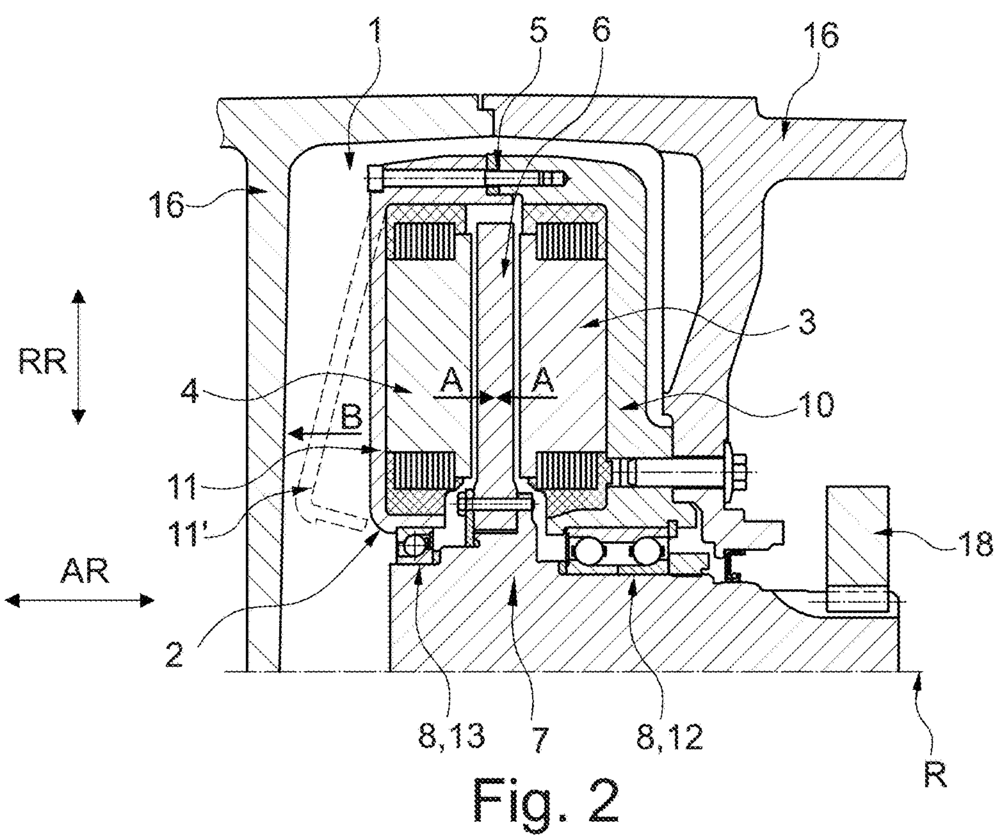
FIG. 2 shows the electric axial flux machine of FIG. 1, in which one stator half is fixed at its radially inner end face to a housing of the axial flux machine and the other stator half is provided with a preload.

FIG. 2 shows the electric axial flux machine of FIG. 1, in which the first stator half 3 is fixed (screwed) at its radially inner end to the axial flux machine housing 16 and the second stator half 4 or the second half shell 11 is provided with a preload. The first half shell 10 is connected to the rotor shaft 7 via the modified bearing 12 (double-row ball bearing). In this regard, the first half shell 10 is significantly thicker and thus more stable than the second half shell 11, as the first half shell 10 is connected to the axial flux machine housing 16 and thus carries the entire motor including the rotor 6 and the rotor shaft 7. In the present case, therefore, only the thinner and more elastic second half shell 11 is provided with a preload force (see second half shell 11' in the free state). The preload force introduced on one side by the second half shell 11 also counteracts (reduces) the magnetic force. The preload force introduced on one side thus reduces the load on both bearings 12, 13. FIG. 2 does not explicitly show the output shaft AW.

However, as an alternative to the above embodiment in FIG. 2, it is also possible to preload two stator halves or half shells of different rigidities. In this case, it is preferable to provide the more rigid stator half with a smaller preload path than the less rigid stator half, so that the preload forces of the two stator halves are in equilibrium in the desired installation position.

Alternatively or in addition to the possibility of providing the stator structure or the half shells themselves with the preload force, it is possible to implement the preload force by means of separate and external preloading elements, in particular springs, which are fastened to the stator housing and act on the structure of the axial flux machine 1 with their force effect.

If at least one of the two stator halves is preloaded, an axial force is transmitted radially on the inside via the bearings and the shaft from one stator half to the other stator half. For this purpose, the radially inner region of the two stator halves must be connected to the shaft via a bearing in each case. In this regard, the bearings can be connected directly to the shaft and the stator half. Alternatively, the connection between the bearing and the shaft can also be made via a component connected to the shaft. The bearing can also be connected to the stator via a component attached to the stator. In the axial flux machine shown in FIG. 2, in which the stator half 3 is screwed to the axial flux machine housing 16, the bearing 12 can alternatively also be fastened to the axial flux machine housing 16. The axial force flow between the stator half 3 and the rotor shaft 7 is then ensured via the axial flux machine housing 16 and the bearing 12.

Figures 3, 4:
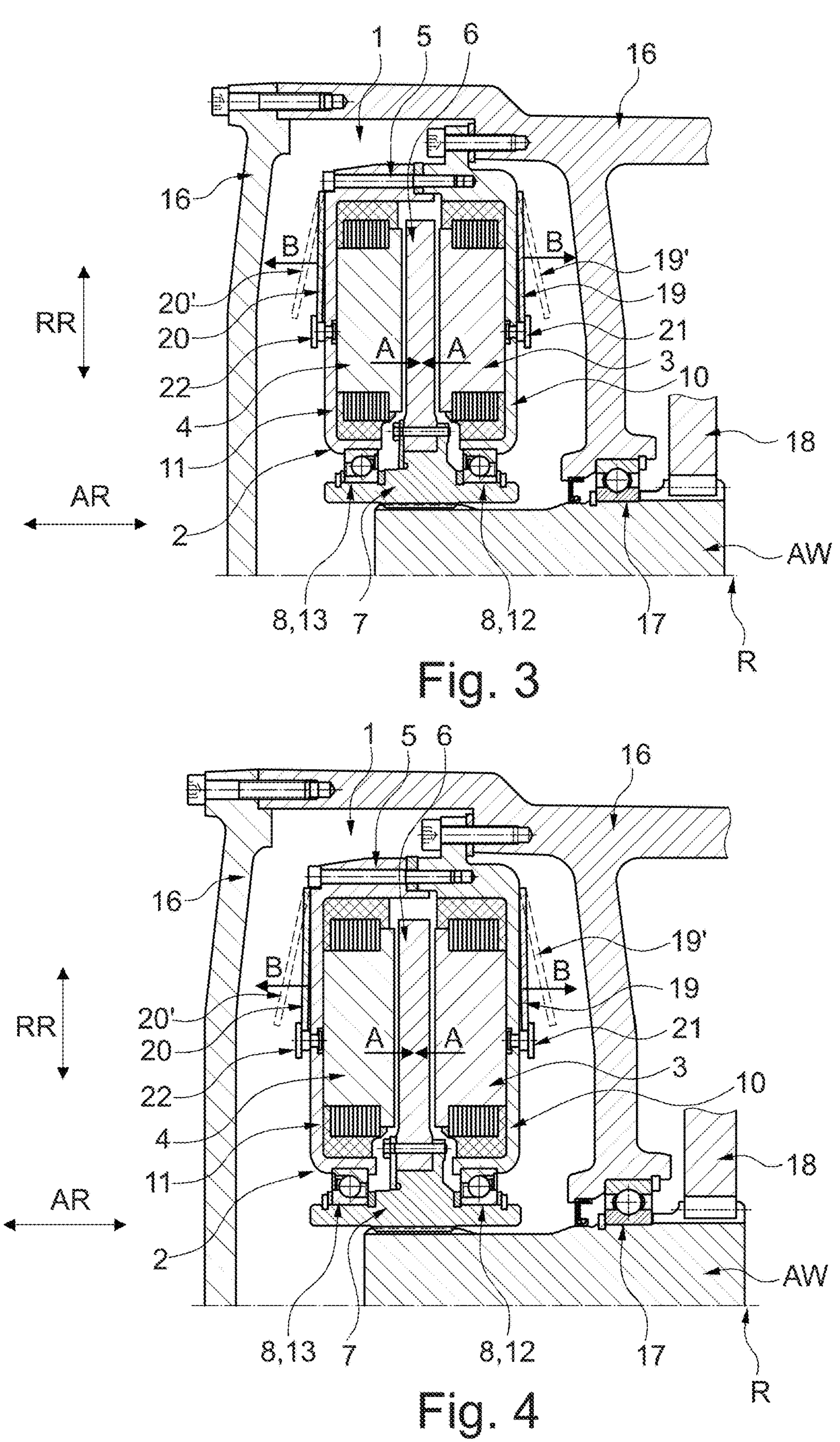
FIG. 3 shows a schematic representation of an electric axial flux machine in an I arrangement in an axial section, in which an external preloading element is mounted on each of the two stator halves.
FIG. 4 shows the electric axial flux machine of FIG. 3, in which the bearing arrangement is designed in the form of two bearings in an O arrangement relative to one another.

In this context, FIG. 3 shows an electric axial flux machine 1, which essentially corresponds to the axial flux machine of FIG. 1, but in which, in contrast, one external preloading element each is mounted on the two stator halves 3, 4. The external preloading element is designed as a first disc spring 19 and a second disc spring 20. The first disc spring 19 is attached to the radially outer end/end face of the first stator half 3 with its outer diameter. With its inner diameter, the first disc spring 19 is fastened to at least one first step pin 21, preferably several step pins distributed around the circumference, which is/are attached to the first half shell 10 at mid-height in the radial direction. Mirroring this, the second disc spring 20 is attached to the radially outer end/end face of the second stator half 4 with its outer diameter. With its inner diameter, the second disc spring 20 is fastened to a second step pin 22, which is attached to the second half shell 11 at mid-height in the radial direction.

The disc springs 19, 20 can thus each exert a tensile force on the central part of the half shells 10, 11 (see the disc springs 19', 20' (dashed line) in a state in which their inner diameter is not connected to the respective step pin 21, 22). This tensile force causes a part of the axially acting magnetic force, which the magnetic field exerts on the half shells 10, 11 via the rotor and stator magnets, to be transmitted from the disc springs 19, 20 to the yoke 5. The proportion of the magnetic force that the disc springs 19, 20 transmit to the yoke 5 is therefore no longer exerted proportionally on the yoke and proportionally on the bearings 12, 13 via the half shells 10, 11. The disc springs 19, 20 transmit the entire magnetic force that they can absorb to the yoke 5, wherein the force that is absorbed by the disc spring is no longer distributed to the yoke and bearing based on the geometric circumstances. This relieves the load on the bearings 12, 13. In contrast to the axial flux machine 1 of FIG. 1, none of the half shells 10, 11 of the axial flux machine 1 of FIG. 3 are integrally provided/designed with a preload force.

In all of the above embodiments of FIGS. 1 to 3, the preload force is selected such that the magnetic force is greater than the preload force, so that the resulting total axial force acts from the stator halves 3, 4 towards the rotor 6.

If external preloading elements, such as the disc springs 19, 20 in this case, are used, they can be optimized for large spring forces as separate components that are otherwise independent of the axial flux machine 1. In this regard, the preload force of the external preloading elements can also be selected such that the total preload force is greater than the maximum occurring magnetic force. This means that the total axial force, which results from the difference between the preload force and the magnetic force, acts away from the rotor 6, starting from the stator halves 3, 4.

FIG. 4 shows such an embodiment of the axial flux machine 1, in which the preload force of the disc springs 19, 20 (or 19', 20') in the axial flux machine 1 known from FIG. 3 is selected such that the total axial force, which results from the difference between the preload force and the magnetic force, acts away from the rotor 6, starting from the stator halves 3, 4. For this reason, the bearings 12, 13 are arranged in an O arrangement in FIG. 4. Due to the total axial force, the radially inner regions of the stator halves 3, 4 are therefore pressed outwards in the axial direction, i.e., away from the rotor 6. The shaft is then subjected to axial tension between the two bearing points and thus holds the two stator halves together radially on the inside. For this reason, the two bearings 12, 13 are aligned in an O arrangement so that the design-related force transmission direction of the bearings matches the direction of force prevailing between the stator halves and the shaft. In the O arrangement, the bearings 12, 13 can pull the two stator halves 3, 4 radially inwards in each case and thus counteract the total axial force. With the bearings mounted in an O arrangement, the rotor shaft 7 is supported on the two stator halves 3, 4 with significantly greater tilting stability than is the case with an X arrangement of the bearings 12, 13.

In the above embodiment, the axial load on the bearings 12, 13 is lowest at maximum magnetic force, as the magnetic force acting towards the rotor counteracts the total axial force. If the magnetic force is less than its maximum value, the axial bearing load increases, as the preload force is then countered by a lower magnetic force.

Figure 5:
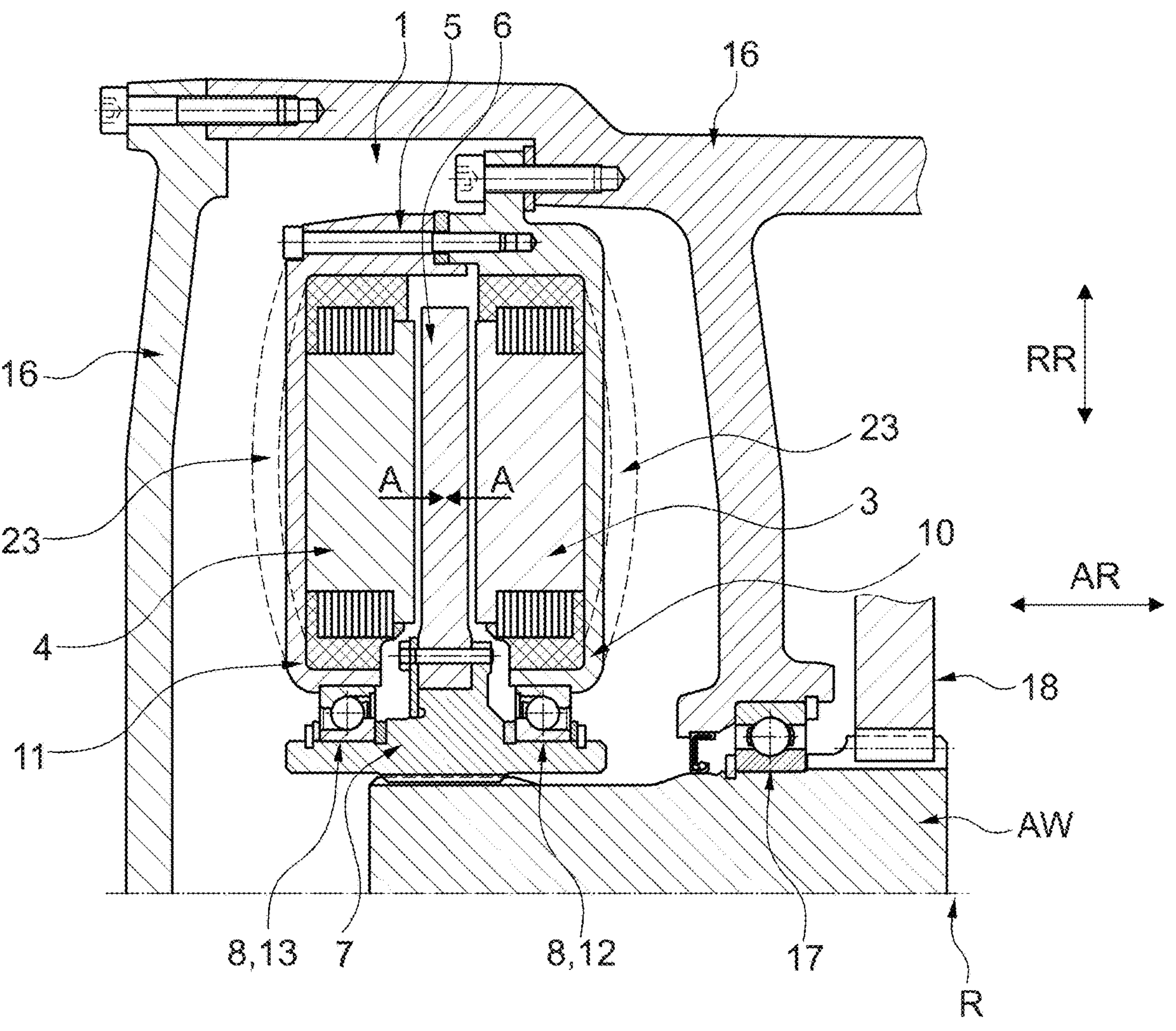
FIG. 5 shows a schematic representation of an electric axial flux machine in an I arrangement in an axial section, in which at least the longitudinal sides of the stator housing are provided with an outer curvature.

FIG. 5 shows the electric axial flux machine 1, in which at least the longitudinal sides or end faces of the first and second half shells 10, 11 are each provided with an outer curvature 23. The axial flux machine 1 of FIG. 5 essentially corresponds to that of FIG. 1 with the difference that the axial flux machine 1 in FIG. 5 exhibits the outer curvature 23 in the half shells 10, 11. The outer curvature 23 has its maximum expansion (in the direction away from the rotor 6) in the axial direction approximately in the center of the half shells 10, 11 as viewed from the radial direction. Of course, it is also conceivable that only one of the half shells 10, 11 is provided with the outer curvature 23, wherein the half shells 10, 11 are then advantageously additionally provided with a preload force. The preload force is created by the fact that the curvature of the unloaded individual parts has elastically disappeared or at least elastically changed when the motor is fully assembled and exposed to the magnetic force.

As already explained above, a large part of the magnetic force is introduced into the central region of the half shells 10, 11 as viewed in the radial direction. This central region of the half shells 10, 11 is therefore at risk of curving outwards towards the rotor due to the strong magnetic force acting here. To counteract this, the half shells 10, 11 are manufactured here with the outer curvature 23. As long as an externally excited axial flux machine 1 is not energized (not under load), the outer curvature 23 is visible or measurable (see dashed line). However, as soon as the axial flux machine 1 is (sufficiently) energized (under load), the half shells 10, 11 are elastically pulled into a flat shape so that they extend along (in) the radial direction. Due to the outer curvature 23 of the half shells 10, 11, it is less likely or even impossible for the half shells 10, 11 to bend towards the rotor.

In a permanently excited axial flux machine, a high axial magnetic force acts between the rotor and the stator even in the non-energized state, so that the outer curvature 23 of the unloaded individual parts (see dashed line) is no longer or no longer completely visible or measurable when the motor is fully assembled and ready for operation. As soon as the axial flux machine 1 is energized (under load), the axial magnetic force changes depending on the load. Due to the curvatures, the stator halves, which are now elastically deformed by the magnetic force, are almost flat and deviate only slightly from the ideal shape in spite of the load-dependent magnetic force fluctuations, as a large part of the expected elastic deformation has already been effected by the curvature and the elastic flattening of the curvature has resulted in a preload force that is directed against the magnetic force acting on the stator half. Due to the outer curvature 23 of the half shells 10, 11, it is less likely or even impossible for the half shells 10, 11 to bend too far towards the rotor.

The outer curvature 23 can thus prevent the air gaps 14, 16 from changing to an impermissible degree (in particular from becoming too small).

It is clear that, as long as this is considered expedient by the person skilled in the art, all of the embodiments listed here can be combined with one another. For example, the half shells 10, 11 can be provided with an outer curvature 23 and external preloading elements (disc springs 19, 20) can also be provided in order to ensure the preloading of the stator half or halves 3, 4.

LIST OF REFERENCE SYMBOLS

1 Electric axial flux machine
2 Stator
3 First stator half
4 Second stator half
5 Radially outer connection, yoke
6 Rotor
7 Rotor shaft
8 Bearing arrangement
9 Stator housing
10 First half shell
11 Second half shell
12 First bearing
13 Second bearing
14 First air gap

15 Second air gap
16 Axial flux machine housing
17 Bearing
18 Gear stage
19 First disc spring
20 Second disc spring
21 First step pin
22 Second step pin
23 Outer curvature (in half shell)
AW Output shaft
R Rotation axis, axial flux machine
Arrow A Effective direction of the magnetic force
Arrow B Effective direction of the preload force
Arrow AR Axial direction
Arrow RR Radial direction

The invention claimed is:

1. An electric axial flux machine comprising a stator with at least one stator half, a rotor arranged in an axial direction relative to the stator and rotatably mounted relative to the stator, and a rotor shaft contacting the rotor in a non-rotatable manner, wherein a magnetic force acts between the rotor and the stator in the axial direction, wherein a preload pushes the at least one stator half away from the rotor in order to counteract the magnetic force, and wherein the at least one stator half itself generates the preload due to its rigidity, wherein the at least one stator half has a first stator half and a second stator half which are connected to one another radially on an outside, wherein the stator has a stator housing which has a first half shell, which defines an outer side of the first stator half, and a second half shell, which defines an outer side of the second stator half, and the first half shell or the second half shell has an inherent rigidity that causes the preload which counteracts the magnetic force, and wherein the preload is applied such that at least one of the first or the second half shell has such a shape in a free state, before the stator halves are exposed to a strong magnetic field and are connected to the rotor shaft via a bearing arrangement, that extends continuously and increasingly away from the rotor, starting from a radially outer region towards a radially inner region.

2. The electric axial flux machine according to claim 1, wherein a preload path of the first or second half shell is set depending on the rigidity of the first or second half shell.

3. The electric axial flux machine according to claim 2, wherein the first and second half shell are equally rigid and a preload path of the first and second half shell is identical, or one of the first and second half shells is more rigid than the other half shell and the more rigid half shell is provided without a preload path or with a smaller preload path than the less rigid half shell.

4. The electric axial flux machine according to claim 3, wherein at least one longitudinal side or end face of the first or second half shell in a state without the action of the magnetic force has an outer curvature expanding away from the rotor in an axial direction or an inner curvature expanding towards the rotor.

5. The electric axial flux machine according to claim 4, wherein two bearings are provided, one of which in each case connects one of the first and second stator halves to the rotor or the rotor shaft and effects an axial force transmission from one stator half to the other stator half via the rotor or the rotor shaft.

6. The electric axial flux machine according to claim 5, wherein a total preload force in the axial flux machine is set smaller than the magnetic force, and the two bearings have an axial force transmission direction which prevents the first stator half and the second stator half from moving towards one another.

7. The electric axial flux machine according to claim 5, wherein a total preload force in the axial flux machine is set greater than a maximum occurring magnetic force, and the two bearings have an axial force transmission direction which prevents the first stator half and the second stator half from drifting apart.

8. An electric axial flux machine comprising:

a stator with at least one stator half, a rotor arranged in an axial direction relative to the stator and rotatably mounted relative to the stator, and a rotor shaft contacting the rotor in a non-rotatable manner, wherein a magnetic force acts between the rotor and the stator in the axial direction, wherein a preload pushes the at least one stator half away from the rotor in order to counteract the magnetic force, and at least one preloading element formed separately from the stator and which is connected to the at least one stator half in order to achieve the preload, wherein the at least one preloading element is an external preloading element formed separately from the at least one stator half, wherein the at least one stator half is provided with the preload by the external preloading element, wherein a first end of the external preloading element is supported on a radially more outwardly located region of the at least one stator half and a second end of the at least one external preloading element is supported on a radially more inwardly located region of the at least one stator half, and wherein each external preloading element comprises a disc spring.

9. The electric axial flux machine according to claim 8, wherein the stator comprises a stator housing having at least one half shell which defines an outer side of the at least one stator half, the first end of the at least one preloading element is coupled to a radially more outwardly located region of the at least one half shell, the second end of the at least one preloading element is coupled to a radially more inwardly located region of the at least one half shell, the electric axial flux machine further comprises at least one step pin disposed along the radially more inwardly located region of the at least one half shell, and the second end of the at least one preloading element is coupled to the at least one step pin at the radially more inwardly located region of the at least one half shell.

* * * * *